US010648908B2

(12) United States Patent
Krivitskiy et al.

(10) Patent No.: US 10,648,908 B2
(45) Date of Patent: May 12, 2020

(54) OPTICAL SYSTEM, METHOD OF FORMING AND OPERATING THE SAME

(71) Applicant: Agency for Science, Technology and Research, Singapore (SG)

(72) Inventors: Leonid Krivitskiy, Singapore (SG); Dmitry Kalashnikov, Singapore (SG); Anna Paterova, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 16/080,849

(22) PCT Filed: Feb. 28, 2017

(86) PCT No.: PCT/SG2017/050090
§ 371 (c)(1),
(2) Date: Aug. 29, 2018

(87) PCT Pub. No.: WO2017/160225
PCT Pub. Date: Sep. 21, 2017

(65) Prior Publication Data
US 2019/0086330 A1    Mar. 21, 2019

(30) Foreign Application Priority Data
Mar. 14, 2016    (SG) .......................... 10201601947V

(51) Int. Cl.
*G01N 21/45*    (2006.01)
(52) U.S. Cl.
CPC ... *G01N 21/45* (2013.01); *G01N 2201/06113* (2013.01)
(58) Field of Classification Search
CPC .................... G01N 21/45; G01N 2201/06113
See application file for complete search history.

(56) References Cited

U.S. PATENT DOCUMENTS

| 5,394,240 A | 2/1995 | Matsumoto |
| 5,952,818 A | 9/1999 | Zhang et al. |

(Continued)

FOREIGN PATENT DOCUMENTS

| CN | 102998260 A | 3/2013 |
| WO | 2013176759 A1 | 11/2013 |

OTHER PUBLICATIONS

Zou, X. Y., Lei J. Wang, and Leonard Mandel. "Induced coherence and indistinguishability in optical interference." Physical review letters 67.3 (1991): 318 (Year: 1991).*

(Continued)

*Primary Examiner* — Dominic J Bologna
(74) *Attorney, Agent, or Firm* — Winstead PC

(57) ABSTRACT

Various embodiments may provide an optical system for determining a refractive index of a sample. The optical system may include a laser source configured to emit a laser beam, and a non-linear crystal configured to generate, based on the laser beam, an infrared light beam which passes through the sample, and a visible signal light beam. The optical system may further include a first mirror configured to reflect the visible signal light beam, a second mirror configured to reflect the infrared light beam so that the reflected infrared light beam interacts with the reflected visible signal light beam in the non-linear crystal, and a photodetector configured to determine a property of the reflected visible signal light beam which has interacted with the reflected infrared light beam for determining the refractive index of the sample.

18 Claims, 19 Drawing Sheets

(56) References Cited

U.S. PATENT DOCUMENTS

| 8,482,738 | B2 | 7/2013 | Rimke et al. | |
|---|---|---|---|---|
| 2009/0303486 | A1* | 12/2009 | Magari | G01N 21/3504 |
| | | | | 356/437 |
| 2015/0177128 | A1* | 6/2015 | Zeilinger | G01N 21/64 |
| | | | | 250/339.07 |

OTHER PUBLICATIONS

Lemos, Gabriela Barreto, et al. "Quantum imaging with undetected photons." Nature 512.7515 (2014): 409 (Year: 2014).*
International Preliminary Report on Patentability for International Application No. PCT/SG2017/050090 dated Dec. 8, 2017, pp. 1-24.
Written Opinion of the International Searching Authority for International Application No. PCT/SG2017/050090 dated May 12, 2017, pp. 1-5.
Kalashnikov et al., "Infrared Spectroscopy with Visible Light," Nature Photonics, vol. 10, Feb. 2016, pp. 98-101.
Lemos et al., "Quantum Imaging with Undetected Photons," Nature, vol. 512, Aug. 27, 2014, pp. 409-412.
Zou et al., "Induced Coherence and Indistinguishability in Optical Interference," Physical Review Letters, vol. 67, No. 3, Jul. 15, 1991, pp. 318-321.

* cited by examiner

100a

100b

Example: Petrochemical FT-IR and FT-NIR vendor share in 2011.

Thermo Scientific – 17%
Agilent – 16%
PerkinElmer – 14%
ABB – 12%
Bruker – 7%
AMETEK – 6%
JASCO – 6%
Eralytics – 4%
Other – 18%

Prior Art

100c

Prior Art

Prior Art

Prior Art

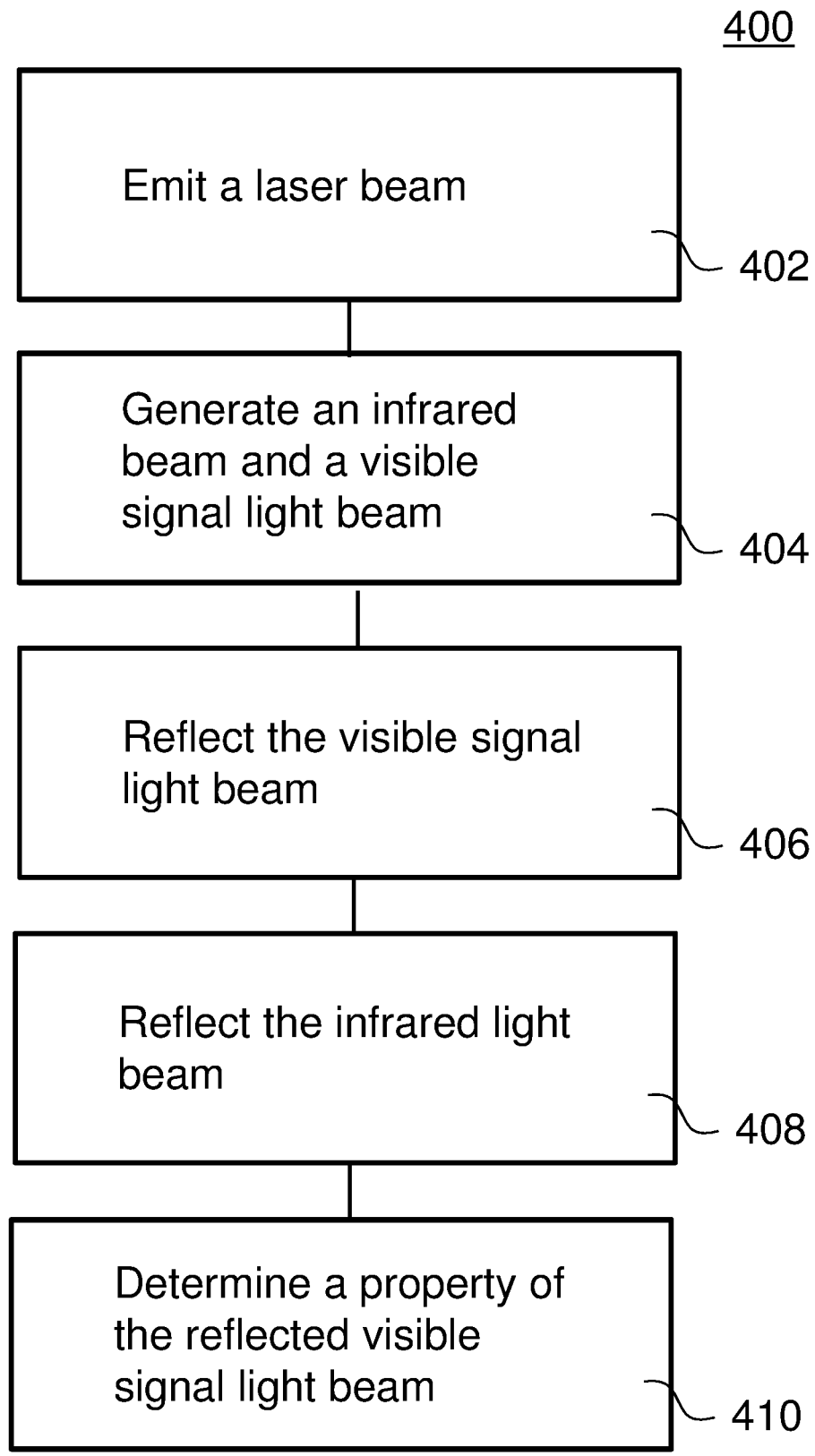

| | Competing design 1<br>D. Kalshnikov et al. | Competing design 2<br>Lemos et al. | Proposed design |
|---|---|---|---|
| Application to spectroscopy | Demonstrated | Not demonstrated | Demonstrated |
| Knowledge of sample properties in visible | Required | Not Required | Not Required |
| Large interaction length | Limited | Not limited | Not limited |
| Necessity of using a CCD camera | Required | Required | Not required |
| Complexity of the setup | Complex | Complex | Simple |
| Footprint of the setup | Bulky | Bulky | Compact |
| Tunability | Yes | Yes in principle (not shown) | Yes |

| Feature | Prior art 1 | Prior art 2 | Prior art 3 | Proposed |
|---|---|---|---|---|
| Only one crystal is used | X | X | X | V |
| Collinear regime | X | X | V | V |
| Separated IR-beam | X | V | V | V |
| Use of point detector | X | V | X | V |
| No interaction with pump | V | V | V | V |
| Single pump beam | X | X | X | V |
| Compact (folded) design | X | X | X | V |
| Easy to align | X | X | X | V |
| Implementation of multi-pass | hard | hard | hard | easy |

| Technique | FTIR | Direct Spectroscopy | Raman Spectroscopy (a complementary method rather than a competing method) | Proposed Solution |
|---|---|---|---|---|
| Principle of operation | Direct light absorption | Direct light absorption | Inelastic light scattering | Interference of down-converted light |
| Absorption coefficient/ accuracy | Yes High | Yes Very high | X IR active vibrations cannot be detected | Yes Very high |
| Refraction coefficient/ accuracy | Yes Indirectly Moderate ($\sim 10^{-2}$) | Yes Indirectly Moderate ($\sim 10^{-2}$) | X | Yes Directly High ($\sim 10^{-6}$) |
| Broadband operation | Yes (6000 – 300 $cm^{-1}$) | Yes (20,000 – 3000 $cm^{-1}$) | Defined by FT/DT spectrometer | Yes (7,000 – 700 $cm^{-1}$) |
| Spectral resolution | Very High ($\sim 0.25$ $cm^{-1}$) | High ($\sim 4$ $cm^{-1}$) | High ($\sim 4$ $cm^{-1}$) | High ($\sim 4$ $cm^{-1}$) |
| Need for IR equipment: source, detector, optics | YES | YES | YES | NO |

| | ΔA, cm⁻¹ | Spectral range, cm⁻¹ | Advantages | Disadvantages |
|---|---|---|---|---|
| Direct spectroscopy | 3.5 | 20,000~3,000 | • Direct measurement of the spectra<br>• Straightforward design<br>• High signal to noise ratio (SNR) typ > 50,000:1<br>• Double beam configuration → removes artifacts | • Need for IR source, optics, detector → extra cost (over 50K $$)<br>• Needs precise calibration<br>• Sequential wavelength scan → Slow acquisition<br>• Requires a slit → low signal |
| FTIR | 0.25 | 6,000~300 | • Fast parallelized readout across broad spectrum (Fellgett advantage)<br>• Does not need a slit → Good SNR typ >30,000/1 (Jacquinot advantage)<br>• High accuracy due to interference of a broadband light (Connes advantage) | • Requires IR source, optics, detector → extra cost (over 20K $$)<br>• Humidity and CO2 controls necessary → requires Nitrogen purging<br>• Artefacts arising from interferogram<br>• Requires a locking laser<br>• All components are detected at the same time → extra noise |
| Nonlinear interferometer | 4 | 20,000~7,000 (extendable to THz Range) | • Directly reveals refractive index and absorption coefficients<br>• No need for IR equipment →Economical<br>• Does not need purging with Nitrogen from source to the detector<br>• Extendable towards THz range (Far-IR) | • The operation range is limited by IR absorption in a nonlinear crystal<br>• Sequential wavelength scan<br>• Sample should be transparent in VIS<br>• Knowledge of refractive index in visible<br>• Pump laser may damage the sample<br>• Limited sensitivity |

OPTICAL SYSTEM, METHOD OF FORMING AND OPERATING THE SAME

CROSS-REFERENCE TO RELATED APPLICATION

This application claims the benefit of priority of Singapore application No. 10201601947V filed on Mar. 14, 2016, the contents of it being hereby incorporated by reference in its entirety for all purposes.

TECHNICAL FIELD

Various aspects of this disclosure relate to an optical system for determining a refractive index of a sample. Various aspects of this disclosure relate to a method of forming an optical system for determining a refractive index of a sample. Various aspects of this disclosure relate to a method of operating an optical system for determining a refractive index of a sample.

BACKGROUND

The infrared (IR) optical spectrum contains vibrational and rotational resonances of many molecules. Using the IR spectral range to probe material may allow a set of unique molecular fingerprints to be obtained. Molecules may have absorption lines in the IR spectrum due to their vibrational and rotational levels. Accordingly, IR optical spectroscopy is a powerful tool for many applications including material analysis, environmental sensing, health diagnostics and others. FIG. 1A is a plot 100a of money (in million of dollars or million $) as a function of year showing the change in values of infrared spectroscopy for different applications in 2009 and 2014. FIG. 1B is a pie chart 100b showing the market share of different vendors of Fourier Transform—Infrared (FTIR) and Fourier Transform—Near Infrared (FT-NIR) in 2011.

Visible-near infrared (VIS-NIR) range optical spectrometers and refractometers may face challenges when they are applied in the IR range, such as inferior performance (in terms of noise level and efficiency) and/or high cost of IR components such as IR optics, IR light sources and IR detectors. Direct Transmission (DT) spectroscopy is now obsolete, while Fourier Transform Infrared (FTIR) is well-established but faces many of the abovementioned problems.

A low-end bench-top Fourier Transform Infrared (FTIR) spectrometer, which is a commonly used and commercially available system applicable for use in a broad spectral range (200 $cm^{-1}$-7000 $cm^{-1}$) and with high resolution (~4 $cm^{-1}$), may cost $20,000.

SUMMARY

Various embodiments may provide an optical system for determining a refractive index of a sample. The optical system may include a laser source configured to emit a laser beam. The optical system may also include a non-linear crystal configured to generate, based on the laser beam, an infrared light beam which passes through the sample, and a visible signal light beam. The optical system may further include a first mirror configured to reflect the visible signal light beam. The optical system may additionally include a second mirror configured to reflect the infrared light beam so that the reflected infrared light beam interacts with the reflected visible signal light beam in the non-linear crystal. The optical system may also include a photodetector configured to determine a property of the reflected visible signal light beam which has interacted with the reflected infrared light beam for determining the refractive index of the sample. The first mirror may be configured so that the reflected visible signal light beam is coherently overlapped with the visible signal light beam. The second mirror may be configured so that the reflected infrared light beam is coherently overlapped with the infrared light beam.

Various embodiments may provide a method of forming an optical system for determining a refractive index of a sample. The method may include providing a laser source configured to emit a laser beam. The method may also include providing a non-linear crystal configured to generate, based on the laser beam, an infrared light beam which passes through the sample, and a visible signal light beam. The method may further include providing a first mirror configured to reflect the visible signal light beam. The method may additionally include providing a second mirror configured to reflect the infrared light beam so that the reflected infrared light beam interacts with the reflected visible signal light beam in the non-linear crystal. The method may also include providing a photodetector configured to determine a property of the reflected visible signal light beam which has interacted with the reflected infrared light beam for determining the refractive index of the sample. The first mirror may be configured so that the reflected visible signal light beam is coherently overlapped with the visible signal light beam. The second mirror may be configured so that the reflected infrared light beam is coherently overlapped with the infrared light beam.

Various embodiments may provide a method of operating an optical system for determining a refractive index of a sample. The method may include emitting, using a laser source, a laser beam. The method may also include generating, based on the laser beam and using a non-linear crystal, an infrared light beam which passes through the sample, and a visible signal light beam. The method may further include reflecting, using a first mirror, the visible signal light beam. The method may additionally include reflecting, using a second mirror, the infrared light beam so that the reflected infrared light beam interacts with the reflected visible signal light beam in the non-linear crystal. The method may also include determining, using a photodetector, a property of the reflected visible signal light beam which has interacted with the reflected infrared light beam to determine the refractive index of the sample. The first mirror may be configured so that the reflected visible signal light beam is coherently overlapped with the visible signal light beam. The second mirror may be configured so that the reflected infrared light beam is coherently overlapped with the infrared light beam.

BRIEF DESCRIPTION OF THE DRAWINGS

The invention will be better understood with reference to the detailed description when considered in conjunction with the non-limiting examples and the accompanying drawings, in which:

FIG. 4 shows a schematic of operating an optical system for determining a refractive index of a sample according to various embodiments.

FIG. 8A shows a table comparing the optical system according to various embodiments and several competing designs.

FIG. 8B shows a table comparing the optical system according to various embodiments and several competing designs.

FIG. 9A is a table comparing several conventional techniques and the method according to various embodiments.

FIG. 9B is a table comparing direct spectroscopy, Fourier Transform Infrared (FTIR) spectroscopy and nonlinear interferometry.

DETAILED DESCRIPTION

Figure 1A:
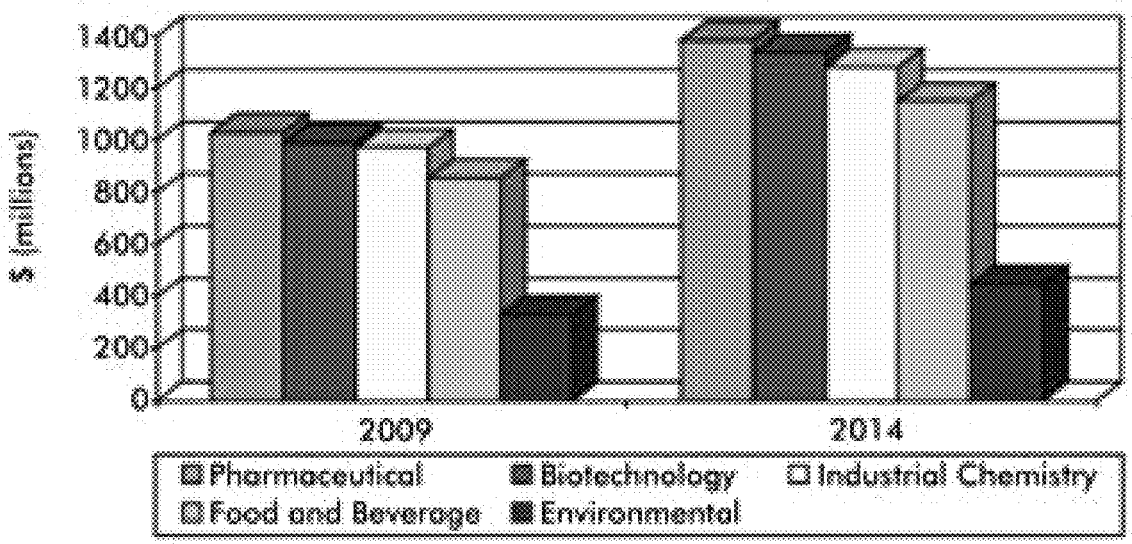
FIG. 1A is a plot of money (in million of dollars or million $) as a function of year showing the change in values of infrared spectroscopy for different applications in 2009 and 2014.
Figure 1B:
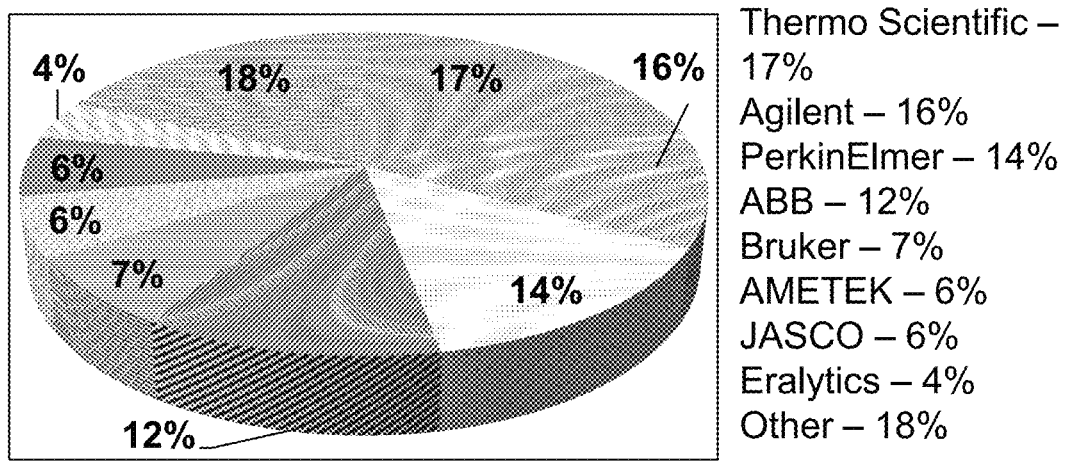
FIG. 1B is a pie chart showing the market share of different vendors of Fourier Transform—Infrared (FTIR) and Fourier Transform—Near Infrared (FT-NIR) in 2011.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or optical systems are analogously valid for the other methods or optical systems. Similarly, embodiments described in the context of a method are analogously valid for an optical system, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The optical system as described herein may be operable in various orientations, and thus it should be understood that the terms "top", "bottom", etc., when used in the following description are used for convenience and to aid understanding of relative positions or directions, and not intended to limit the orientation of the optical system.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Recently, an elegant approach based on using optical instruments for the visible range has been proposed for IR spectroscopy (Zou, X. Y., Wang, L. J. & Mandel, L., Phys. Rev. Lett. 67, 318-321 (1991)). This approach may be referred to as non-linear spectroscopy. The idea is to introduce frequency correlation between infrared and visible light using a process of Parametric Down Conversion (PDC). A specific interferometric scheme allows measurement of a transmission spectrum of the sample in the IR-range based on the interference pattern observed for a visible photon. This scheme does not require the use of IR-range optical equipment.

However, the major disadvantage of this scheme is the requirement for prior knowledge of visible range properties of the media. The properties would need to be obtained beforehand from independent additional measurements.

Accordingly, such a scheme may not be convenient for many practical applications as it requires much resource and is time consuming. Also, the scheme may be limited in terms of the level of achievable sensitivity (detection limit). For high sensitivity measurements, the distance between crystals should be increased. The increase of the distance leads to an extremely fine angular interference pattern, which requires long focal length lens and/or a charge-coupled device (CCD) camera with a very small pixel size. These components are bulky and typically quite expensive.

Figure 1C:
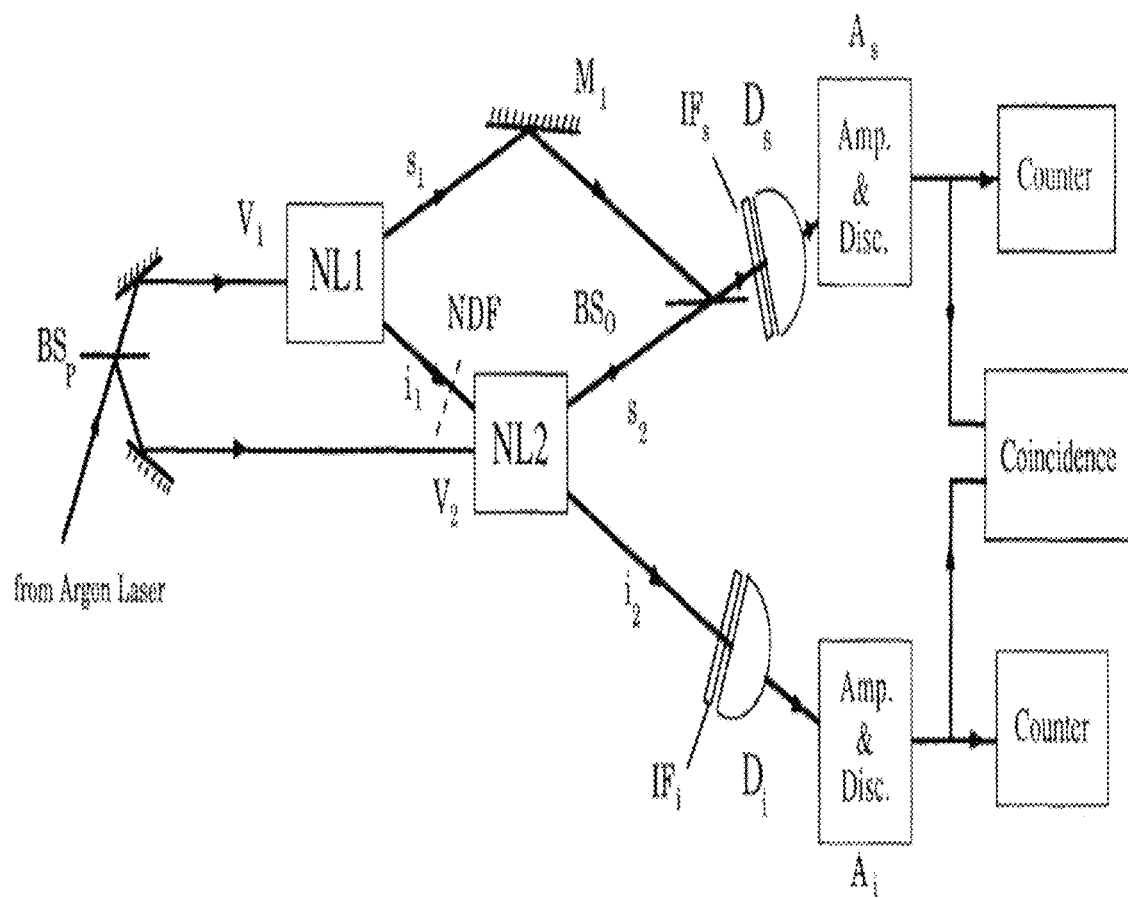
FIG. 1C shows a schematic of a setup relating to non-linear spectroscopy using two non-linear crystals.
Figure 1D:
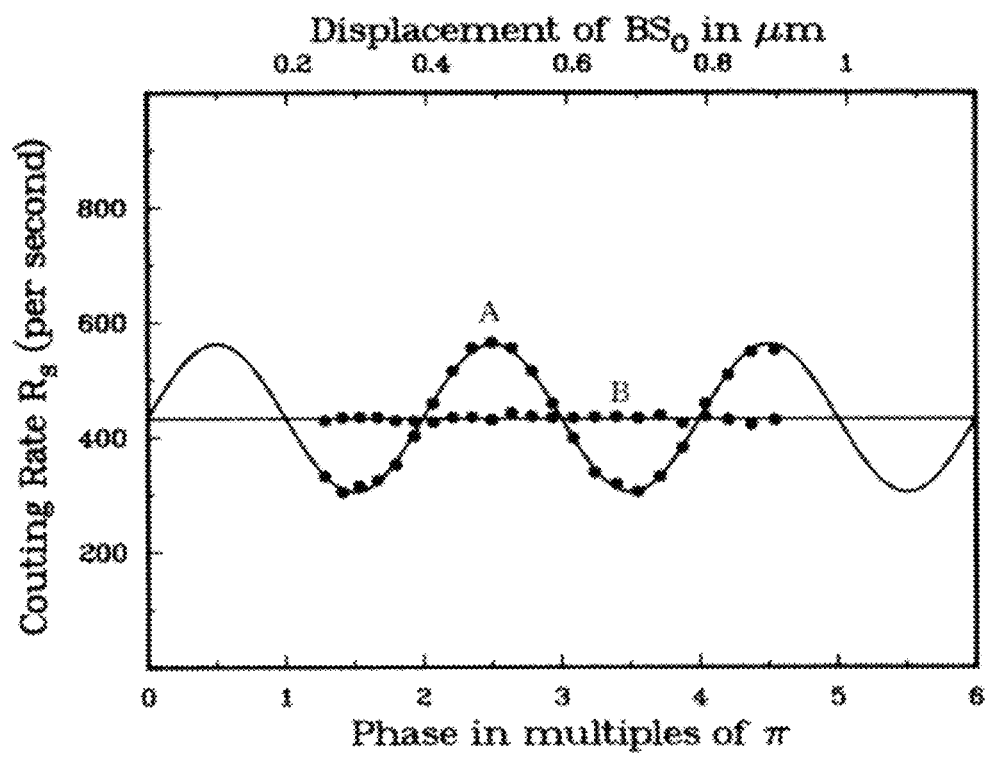
FIG. 1D shows a plot of the touting rate (per second) as a function of phase (in multiples of π radians).

FIG. 1C shows a schematic of a setup 100c relating to non-linear spectroscopy using two non-linear crystals. The setup 100c is based on a paper by Zou et al. FIG. 1D shows a plot 100d of the couting rate (per second) as a function of phase (in multiples of $\pi$ radians). The two non-linear crystals may make alignment more difficult. Further, the setup 100c involves a bulky "unfolded" design. Also, tuning is challenging, is not demonstrated, and multipass is hard to achieve.

Figure 1E:
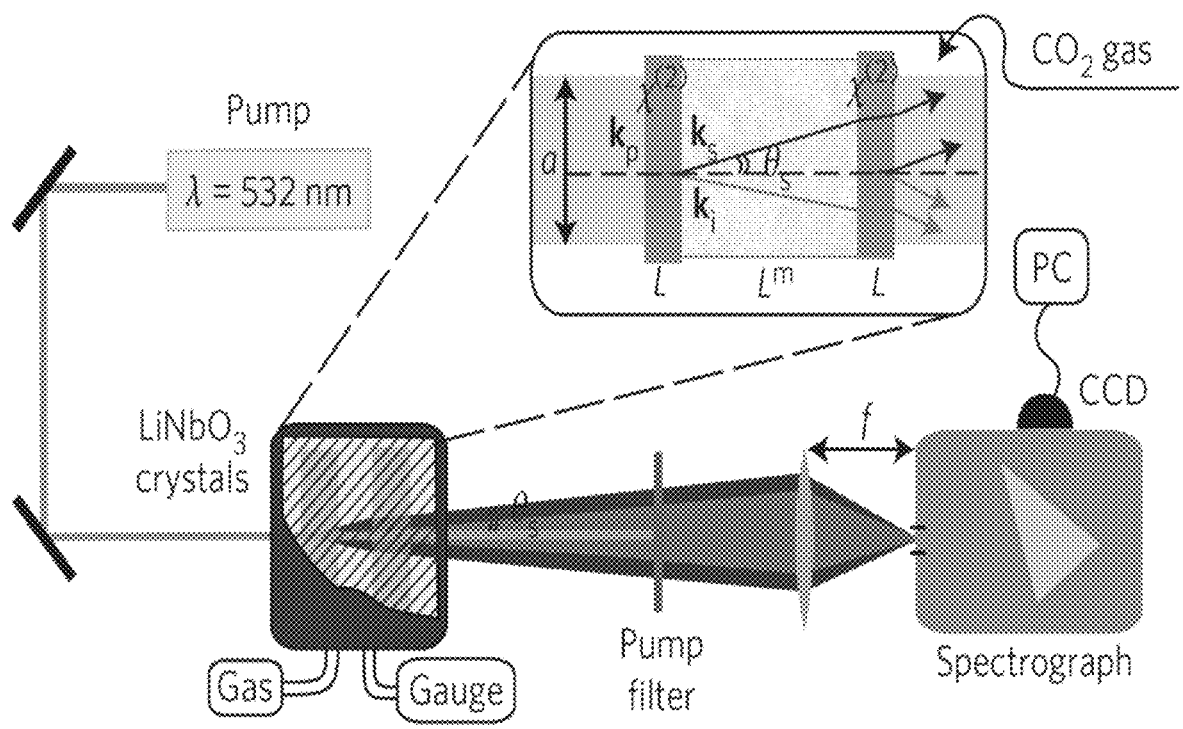
FIG. 1E shows a schematic of another setup relating to non-linear spectroscopy using lithium niobate ($LiNbO_3$) crystals.

FIG. 1E shows a schematic of another setup 100e relating to non-linear spectroscopy using lithium niobate ($LiNbO_3$) crystals. The setup 100e is based on a paper by D. Kalashnikov et al. (Nature Photonics 10, 98-101, 2016). The setup 100e directly reveals the refractive index and absorption coefficients, needs IR equipment which is economical, does not need purging with nitrogen from the source to the detector, is extendable towards the terahertz (THz) range (far-IR range), and does not require scanning (as different angles of emitting waves are at different phases). However, knowledge of the refractive index as well as absorption of the sample in the visible range is required. Further, a CCD camera is required, a high level of sensitivity cannot be achieved, two nonlinear crystals are used, and there is possible damage by the pump laser to the sample.

Figure 1F:
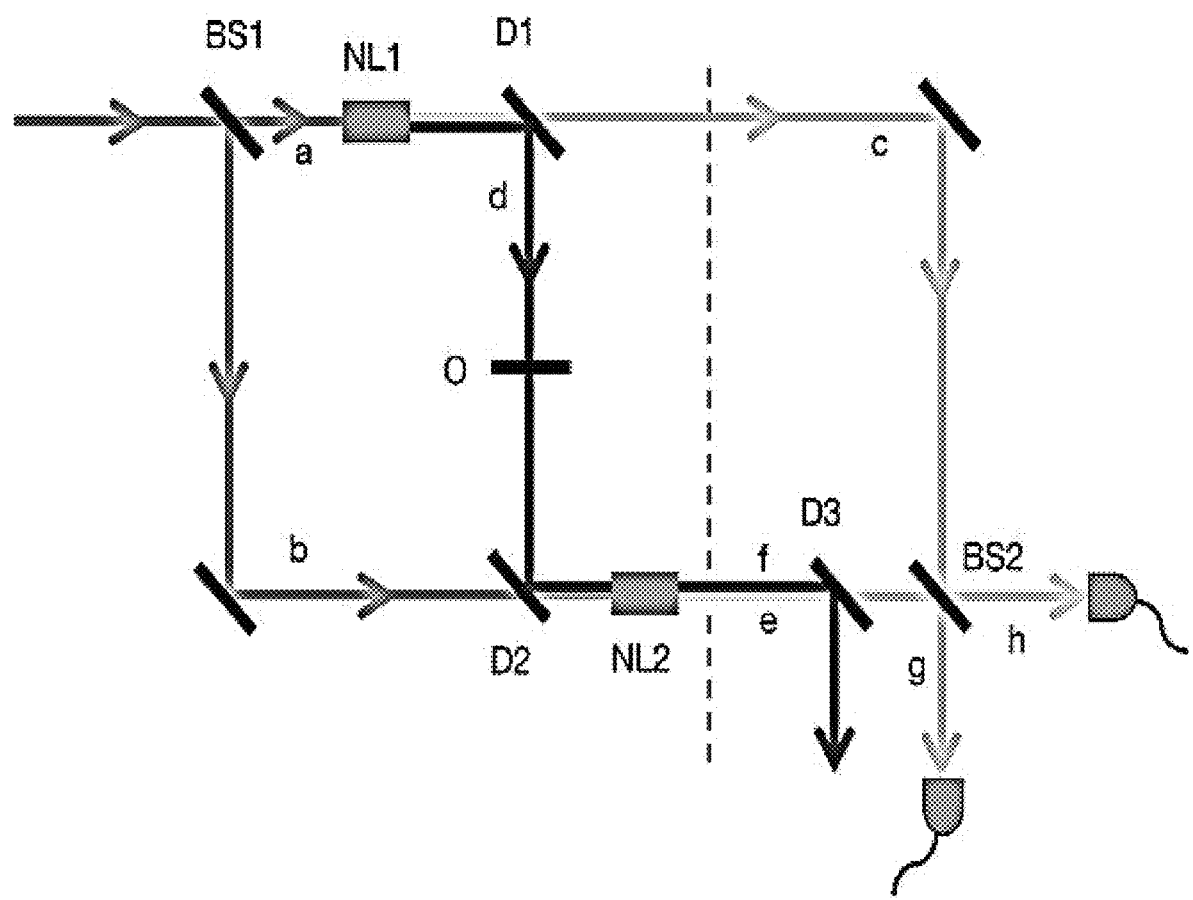
FIG. 1F shows a schematic of yet another setup including non-linear crystals.

FIG. 1F shows a schematic of yet another setup 100f including non-linear crystals. The setup 100f is based on a paper by Lemos, G. B. et al. (Nature 512, 409-412, 2014). The setup 100f also uses two non-linear crystals, and is bulky due to "unfolded" design. Further, tuning is challenging, is not demonstrated and multi-pass is hard to achieve.

Figure 2:
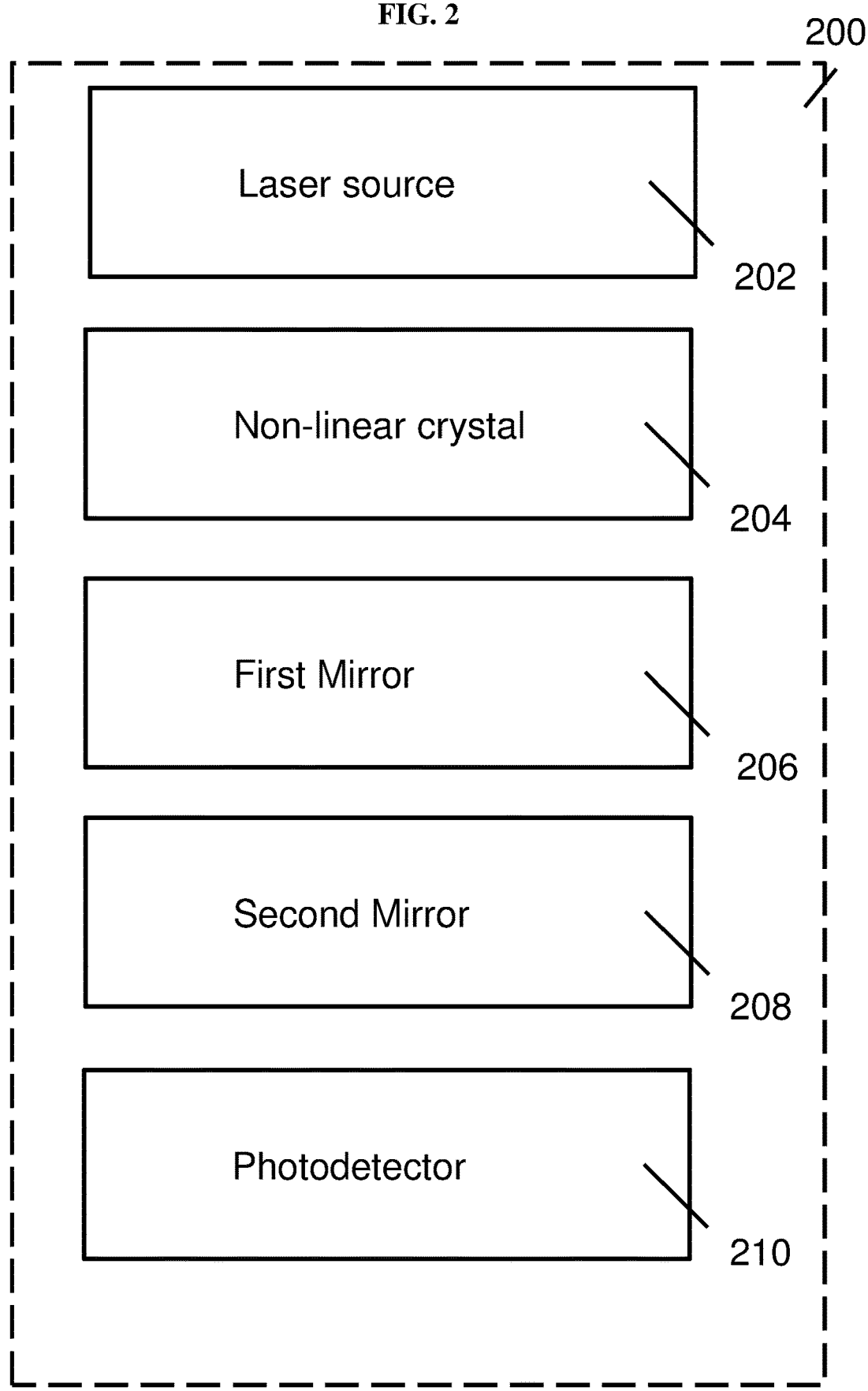
FIG. 2 is an illustration of an optical system for determining a refractive index of a sample according to various embodiments.

FIG. 2 is an illustration of an optical system 200 for determining a refractive index of a sample according to various embodiments. The optical system 200 may include a laser source 202 configured to emit a laser beam. The optical system 200 may also include a non-linear crystal 204 configured to generate, based on the laser beam, an infrared light beam which passes through the sample, and a visible signal light beam. The optical system 200 may further include a first mirror 206 configured to reflect the visible signal light beam. The optical system 200 may additionally include a second mirror 208 configured to reflect the infrared light beam so that the reflected infrared light beam interacts with the reflected visible signal light beam in the non-linear crystal 204. The optical system 200 may also include a photodetector 210 configured to determine a property of the reflected visible signal light beam which has interacted with the reflected infrared light beam for determining the refractive index of the sample. The first mirror 206 may be configured so that the reflected visible signal light beam is coherently overlapped with the visible signal light beam. The second mirror 208 may be configured so that the reflected infrared light beam is coherently overlapped with the infrared light beam.

In other words, the optical system 200 may be used to determine a refractive index of a sample by using a non-linear crystal 204. The non-linear crystal 204 may generate an infrared light beam and a visible signal light beam upon being pumped by a laser beam from an optical source 202. Mirrors 206, 208, may reflect the visible signal light beam and the infrared light beam respectively back to the crystal 204 where they interfere with each other. The infrared signal beam passes through the sample. A photodetector 210 is used to determine a property of the reflected signal light beam (which has interacted with the infrared light beam) to determine the refractive index of the sample.

By measuring or detecting visible light photons, the infrared (IR) properties of the sample may be determined based on the measurements of the visible photons.

Various embodiments may seek to address or mitigate the problems faced by conventional optical systems/devices. Various embodiments may have advantages over conventional device. Various embodiments seek to provide a highly sensitive, compact and practical system or instrument based on nonlinear interference effect which addresses practical limitations of prior art approaches. Various embodiments may remove the need to know the properties of the sample in the visible range. Various embodiments may require only a single non-linear crystal instead of two non-linear crystals. Various embodiments may improve the sensitivity of measurements. Various embodiments may allow the use of a point photodetector instead of a CCD. Various embodiments may remove or reduce the possibility of damage of the sample by the pump laser.

The refractive index of the sample may refer to the refractive index of sample when an infrared light passes through the sample. The infrared light may have a wavelength of the infrared light beam. The refractive index may be the real portion (dispersion) and/or the imaginary portion (absorption).

The visible signal light beam may include a plurality of photons in the visible range, while the infrared light beam may include a plurality of photons in the infrared range. The plurality of photons in the infrared range may be referred to as idler photons. The infrared light beam may also be referred to as idler light beam.

Various embodiments may be based on the effect of Parametric Down Conversion (PDC) in a nonlinear optical medium 204, which produces pairs of highly correlated photons. As highlighted above, the signal photon wavelength may be in the visible range, and the wavelength of the correlated idler photon may be in the infrared range.

The reflected visible signal light beam interacting with the reflected infrared light beam may refer to the reflecting visible signal light beam interfering with the reflected infrared light beam.

In various embodiments, the optical system 200 may include an adjusting system for adjusting a position of the second mirror 208. The position of the second mirror 208 may be adjusted to vary the property, e.g. intensity, of the reflected visible signal light beam.

The non-linear crystal 204 may include any one material selected from a group consisting of lithium niobate, beta-barium borate, and silver thiogallate. The non-linear crystal 204 may include any other suitable material.

The non-linear crystal 204 may be configured to generate the infrared light beam and the visible signal light beam based on a parametric down conversion process.

The property of the reflected visible signal light beam may be an intensity of the reflected visible signal light beam.

In various embodiments, the photodetector 210 may be a point photodetector

Various embodiments may relate to an optical system 200 in which the visible pump beam, the infrared light beam, and the visible signal light beam are emitted in the same direction and along a line, i.e. in a collinear manner, from the non-linear crystal 204.

In various embodiments, the non-linear crystal 204 may be further configured to generate, based on the laser beam, a visible pump light beam. The first mirror 206 may be configured to reflect the visible pump light beam. The reflected visible pump light beam may interact or interfere with the reflected infrared light beam and the reflected visible signal light beam in the non-linear crystal 204.

The visible pump light beam may be the laser beam. In other words, only a portion of the laser beam may be down converted into the visible signal light beam and the infrared light beam, while the remaining portion, i.e. the visible pump light beam, is not down converted. The visible pump light beam may include a plurality of photons, which have not been down converted by the non-linear crystal 204, and which are in the visible range.

The optical system 200 may also include a dichroic beam splitter configured to direct the laser beam to the non-linear crystal 204. The first dichroic splitter may be further configured to separate the reflected visible signal light beam and the reflected visible pump light beam. The dichroic splitter may be configured to direct the reflected visible signal light beam in a first direction and to direct the reflected visible pump light beam in a second direction different from the first direction.

The optical system 200 may also include a further dichroic beam splitter configured to separate the infrared light beam from the visible light beam and the visible pump light beam so that the visible light beam and the visible pump light beam are reflected by the first mirror 206 and the infrared light beam is reflected by the second mirror 208.

The optical system 200 may further include a pinhole configured to allow a portion of the visible light beam, the visible pump light beam and the infrared light beam generated by the non-linear crystal through to the further dichroic beam splitter in a collinear direction.

The optical system 200 may additionally include a filter system configured to filter out the reflected visible signal light beam for passing to the photodetector 210.

Various embodiments may relate to an optical system 200 in which the visible pump beam, the infrared light beam, and the visible signal light beam are emitted in different direction from the non-linear crystal 204.

In various embodiments, the non-linear crystal 204 may be further configured to generate, based on the laser beam, a visible pump light beam. The optical system 200 may further include a third mirror configured to reflect the visible pump light beam. The reflected visible pump light beam may interact with the reflected infrared light beam and the reflected visible signal light beam in the non-linear crystal 204.

The visible signal light beam may travel from the non-linear crystal 204 in a first direction to the first mirror 206. The infrared light beam may travel from the non-linear crystal 204 in a second direction to the second mirror 208. The visible pump light beam may travel from the non-linear crystal 204 in a third direction to the third mirror. The first direction, the second direction, and the third direction may be different directions.

Figure 3:
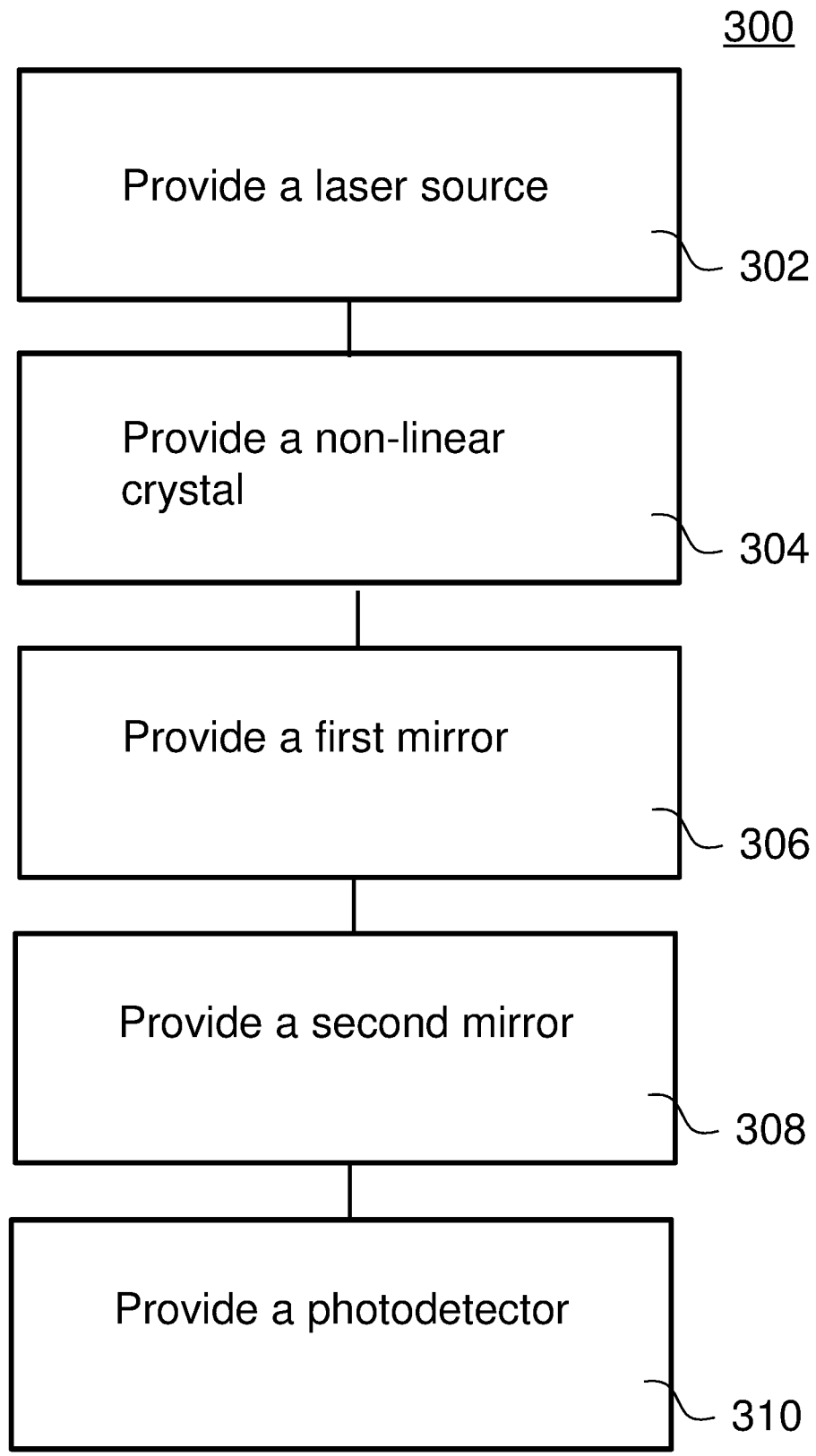
FIG. 3 shows a schematic of a method of forming an optical system for determining a refractive index of a sample according to various embodiments.

FIG. 3 shows a schematic 300 of a method of forming an optical system for determining a refractive index of a sample according to various embodiments. The method may include, in 302, providing a laser source configured to emit a laser beam. The method may also include, in 304, providing a non-linear crystal configured to generate, based on the laser beam, an infrared light beam which passes through the sample, and a visible signal light beam. The method may further include, in 306, providing a first mirror configured to reflect the visible signal light beam. The method may additionally include providing, in 308, a second mirror configured to reflect the infrared light beam so that the reflected infrared light beam interacts with the reflected visible signal light beam in the non-linear crystal. The method may also include providing, in 310, a photodetector configured to determine a property of the reflected visible signal light beam which has interacted with the reflected infrared light beam for determining the refractive index of the sample. The first mirror may be configured so that the reflected visible signal light beam is coherently overlapped with the visible signal light beam. The second mirror may be configured so that the reflected infrared light beam is coherently overlapped with the infrared light beam.

In other words, the method may include forming an optical system as described herein. The method may include assembling or arranging the various components such as the laser source, the non-linear crystal, the first mirror, the second mirror, and the photodetector so that a refractive index of a sample may be determined by determining a property of the visible signal light beam.

FIG. 4 shows a schematic 400 of operating an optical system for determining a refractive index of a sample according to various embodiments. The method may include, in 402, emitting, using a laser source, a laser beam. The method may also include, in 404, generating, based on the laser beam and using a non-linear crystal, an infrared light beam which passes through the sample, and a visible signal light beam. The method may further include, in 406, reflecting, using a first mirror, the visible signal light beam. The method may additionally include, in 408, reflecting, using a second mirror, the infrared light beam so that the reflected infrared light beam interacts with the reflected visible signal light beam in the non-linear crystal. The method may also include, in 410, determining, using a photodetector, a property of the reflected visible signal light beam which has interacted with the reflected infrared light beam to determine the refractive index of the sample. The first mirror may be configured so that the reflected visible signal light beam is coherently overlapped with the visible signal light beam. The second mirror may be configured so that the reflected infrared light beam is coherently overlapped with the infrared light beam.

In other words, the method may include providing a laser beam to pump a non-linear crystal to generate an infrared light beam and a visible signal light beam, reflecting the visible signal light beam and the infrared light beam back to the non-linear crystal so that there is interference in the non-linear crystal, with the infrared light beam passing through the sample before interacting with the visible signal light beam in the crystal. The method may include determining a refractive index of a sample by determining a property of the visible signal light beam.

Determining a refractive index of the sample may include determining the refractive index of the sample in the infrared range, i.e. at the wavelength of the infrared light beam.

The method may also include adjusting a position of the second mirror so that the total distance travelled by the infrared light beam from the non-linear crystal to the second mirror and by the reflected infrared light beam from the second mirror to the non-linear crystal is changed.

The infrared light beam and the visible signal light beam may be generated from the laser beam using a parametric down conversion process.

The method may also include generating, based on the laser beam and using the non-linear crystal, a visible pump light beam. The reflected visible signal light beam determined by the photodetector may have also interacted with the visible pump light.

In various embodiments, the visible pump light beam, the visible signal light beam and the infrared light beam emitted from the non-linear crystal may travel along a line in a collinear manner. The visible pump light beam may be reflected by the first mirror, with the visible signal light beam.

In various embodiments, the visible pump light beam, the visible signal light beam and the infrared light beam emitted from the non-linear crystal may travel in different directions. The visible pump light beam is reflected by a third mirror. The visible pump light beam and the visible signal light beam may be reflected by different mirrors.

In various embodiments, the signal photons and the idler photons may be emitted collinear with the pump photons. The infrared (idler) photons may be split from the visible photons (including the signal photons and the pump photons) using a dichroic beam splitter and sent to two different arms of an interferometer. The photons may be reflected back to the crystal by the mirrors placed in each arm of the interferometer. The coherent overlap of photons from the two different arms, i.e. reflected idler photons from one arm, and reflected signal and pump photons from another arm, through the spontaneous parametric down conversion (SPDC) crystal, i.e. the non-linear crystal, may lead to an interference effect. The modulation period may be determined by acquired phase shifts and absorptions of all the three interacting photons: signal, idler and pump photons.

The interference pattern of the visible signal photons may be obtained by scanning or varying displacements of mirrors in the interferometer. If a sample is placed in the path of an infrared or idler photon, the transmission of the infrared or idler photon may modify the period and visibility or intensity of the interference pattern for the visible signal photon. Thus the properties of the sample or medium in the infrared range may be determined from the measured interference pattern of the visible signal photons.

The intensity of signal photons may be provided by:

$$I_s(\varphi_s) \propto \{1 + |\tau_i|^{1/2} \cos(\varphi_p + \varphi_s + \varphi_i)\} \quad (1)$$

where $\varphi_p = k_p L_p$; $\varphi_s = k_s L_s$; $\varphi_i = k_i L_i$, where $L_j$ is the length of the interferometer arm for the respective wave, in which index j=p, s, i correspond to pump photons, signal photons, and idler photons, respectively. The wavevectors may be given by $$k_j = 2\pi n_j / \lambda_j, \quad (2)$$

where $n_j$ is the refractive index in the respective interferometer arm, and $\lambda_j$ is a wavelength. $\tau_i$ is the transmission coefficient of the sample under investigation, which is placed in the path of the idler photon.

Interference fringes of detected signal photons (in the visible range) may be influenced by the phase and transmission of infrared or idler photons as shown in Equation (1). The sample or medium, which is inserted in the infrared branch of the interferometer, may change both $\varphi_i$ and $\tau_i$, and thus modify the interference pattern. The refractive index of the medium for the infrared or idler photons (i.e. at the wavelength of the infrared light beam) may be inferred using Equation (1) from the interference pattern of the signal photons in the visible range. Absorption, at the wavelength of the idler photons (in the infrared range) may decrease the visibility (V) of the interference pattern, determined as:

$$V = \frac{I_{max} - I_{min}}{I_{max} + I_{min}}, \quad (3)$$

where $I_{max}$ and $I_{min}$ are maximum and minimum values of the intensity. From here, the absorption coefficient at the wavelength of the idler photon can be inferred as $$\tau_i = V^2. \quad (4)$$

Figure 5A:
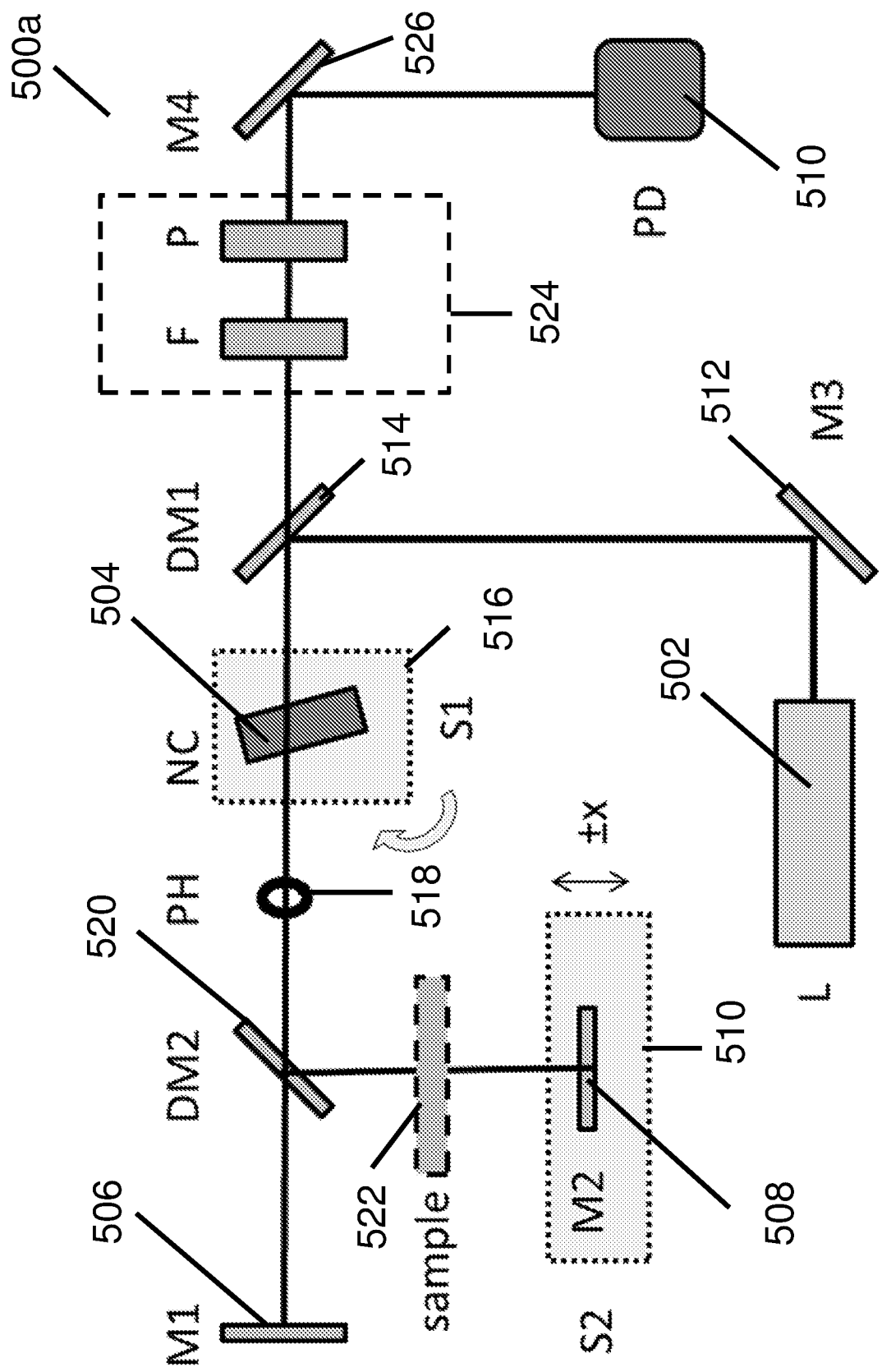
FIG. 5A shows a schematic of an optical system for determining a refractive index of a sample according to various embodiments.

FIG. 5A shows a schematic of an optical system 500a for determining a refractive index of a sample according to various embodiments. The optical system 500a may include a laser source 502 (denoted as L) which is configured to emit a laser beam (continuous wave or pulsed), and a non-linear crystal 504 (denoted as NC, e.g. type-I SPDC). The non-linear optical crystal 504 may be pumped by the laser source 502. The optical system 500a may also include a directing mirror 512 (denoted as M3) and a dichroic beam splitter or grating 514 (denoted as DM1). The mirror 512 and the dichroic beam splitter 514 may direct the laser beam from the laser source 502 to the non-linear crystal 504. The non-linear crystal 504 may be mounted or attached to a mount 516 (denoted as S1), which is configured to control an orientation of the optical axis of the non-linear optical crystal 504 with respect to the laser beam (pump beam). The mount 516 may be further configured to control a temperature of the non-linear crystal 504. The operation wavelengths (i.e. of the visible signal light beam and/or the infrared light beam) may be adjusted by controlling the orientation of the crystal 504, based on the calculations of energy and momentum conservation conditions of the crystal 504.

Down converted photons (i.e. the visible signal light beam in the visible range and the infrared light beam in the infrared range) may be emitted collinearly (same direction) with the visible pump light beam. In other words, some of the photons in the laser beam may be down-converted into the visible signal light beam and the infrared light beam, while the remaining photons may not be down-converted (remain as the visible pump light beam). The visible signal light beam, the visible pump light beam, and the infrared light beam may travel along a common beam path through a pinhole 518 (denoted as PH) to a further dichroic beam splitter 520 (denoted as DM2).

The optical system 500a may further include the pinhole 518 (denoted as PH) or aperture. The angular size of the pinhole 518 may be smaller than the angular size of the first interference maxima of the interference pattern, which may be roughly equivalent to the size of the laser beam (pump beam).

The optical system 500a may also include the further dichroic beam splitter 520 (denoted as DM2). The further dichroic beam splitter 520 may be configured to transmit the visible beams, i.e. the visible signal light beam and the visible pump light beam, and may be configured to reflect the infrared light beam. In other words, the visible beams and the infrared light beam may be directed in two different directions. It may be envisioned that in various alternate embodiments, the visible beams may be reflected, while the infrared light beam may be transmitted.

The optical system 500a may include a first mirror 506 (denoted as M1) configured to reflect the visible signal light beam and the visible pump light beam. The first mirror 506 may be a broadband 100% reflective mirror (dielectric or metallic) for a visible range. The optical system 500a may include a second mirror 508 (denoted as M2) configured to reflect the infrared light beam. The infrared light beam may travel or be transmitted through a sample 522 before being reflected by the second mirror 508. The reflected infrared light beam may travel or be transmitted through the sample 522. The second mirror 508 may be a 100% broadband infrared (IR) mirror. The sample 522 may be held by or inserted onto a sample holder, which may be placed at the arm of the interferometer along which only the infrared photons are travelling. The first mirror 506 and the second mirror 508 may each be arranged so that the incoming light beams overlap coherently with the reflected light beams. The incoming infrared light beam may overlap coherently with the reflected infrared light beam, the incoming visible signal light beam may overlap coherently with the reflected visible signal light beam, and the incoming visible pump light beam may overlap coherently with the reflected visible pump light beam.

The optical system 500a may also include an adjusting system or translation stage 510. The second mirror 508 may be mounted or attached to the translation stage 510, which may be manually operated, motorized, or operated via piezoelectric means to control displacement (±x). The translation stage 510 may be configured so that the translation step is sufficiently fine (at least half the wavelength of the visible pump light beam).

The coherence lengths of the reflected visible beams, and the coherence length of the reflected infrared light beam may be equal to greater than the distance travelled by the beams between the crystal 504 and each of the two mirrors 506, 508 (i.e. the two arms of the interferometer). The coherence length may be inversely proportional to the frequency bandwidth of the photon. By adjusting the translation stage 510, the offset between the reflected beams may be adjusted so as to vary the intensity of the reflected visible signal light beam. The interference pattern of the reflected visible signal beam may form due to the coherent interaction of the reflected visible pump light beam, the reflected visible signal light beam, and the reflected infrared light beam in the non-linear crystal 504.

The reflected visible beams and the reflected infrared light beam may be directed through the further dichroic mirror 520, the pinhole 518 and the non-linear crystal 504 to the dichroic beam splitter 514. The dichroic mirror 514 may be configured to separate the reflected visible signal light beam and the reflected visible pump light beam. As shown in FIG. 5A, the reflected signal visible light beam may be transmitted through the dichroic mirror 514, while the reflected visible pump light beam may be reflected by the dichroic mirror 514. It may however be envisioned that in various alternate embodiments, the reflected visible signal light beam may be reflected by the dichroic beam splitter 514, while the reflected visible pump light beam may be transmitted through the dichroic beam splitter 514.

The reflected visible signal light beam may pass through a filter system 524 to filter out any remaining pump light photons, and/or to perform fine wavelength selection of the signal. The filter system and include a set of notch filter(s), polarizer(s), and/or diffractive grating(s). The reflected visible signal light beam may be directed to a photodetector 510 (PD) via a mirror 526 (M4). The optical system 500a may further include a lens and/or optical fiber to direct and/or focus the reflected visible signal light beam onto the photodetector 510. The photodetector 510 may be a point photodetector or photodide.

The position of the mirror 508 may be varied and the variation of the intensity of the reflected visible signal light beam as a function of the position of the mirror 508 may be measured and/or recorded. The absorption coefficient and/or refractive index (dispersion and/or absorption) of the sample 522 in the infrared range may be determined based on the visibility and/or shift of the interference fringes via Equation (1). In various alternate embodiments, the mirror 506 may be mounted on the adjusting system or translation stage 510, and the position of the mirror 506 may be varied. In other words, one of the mirrors 506, 508 may be adjusted so as to vary the intensity of the reflected visible signal light beam.

Figure 5B:
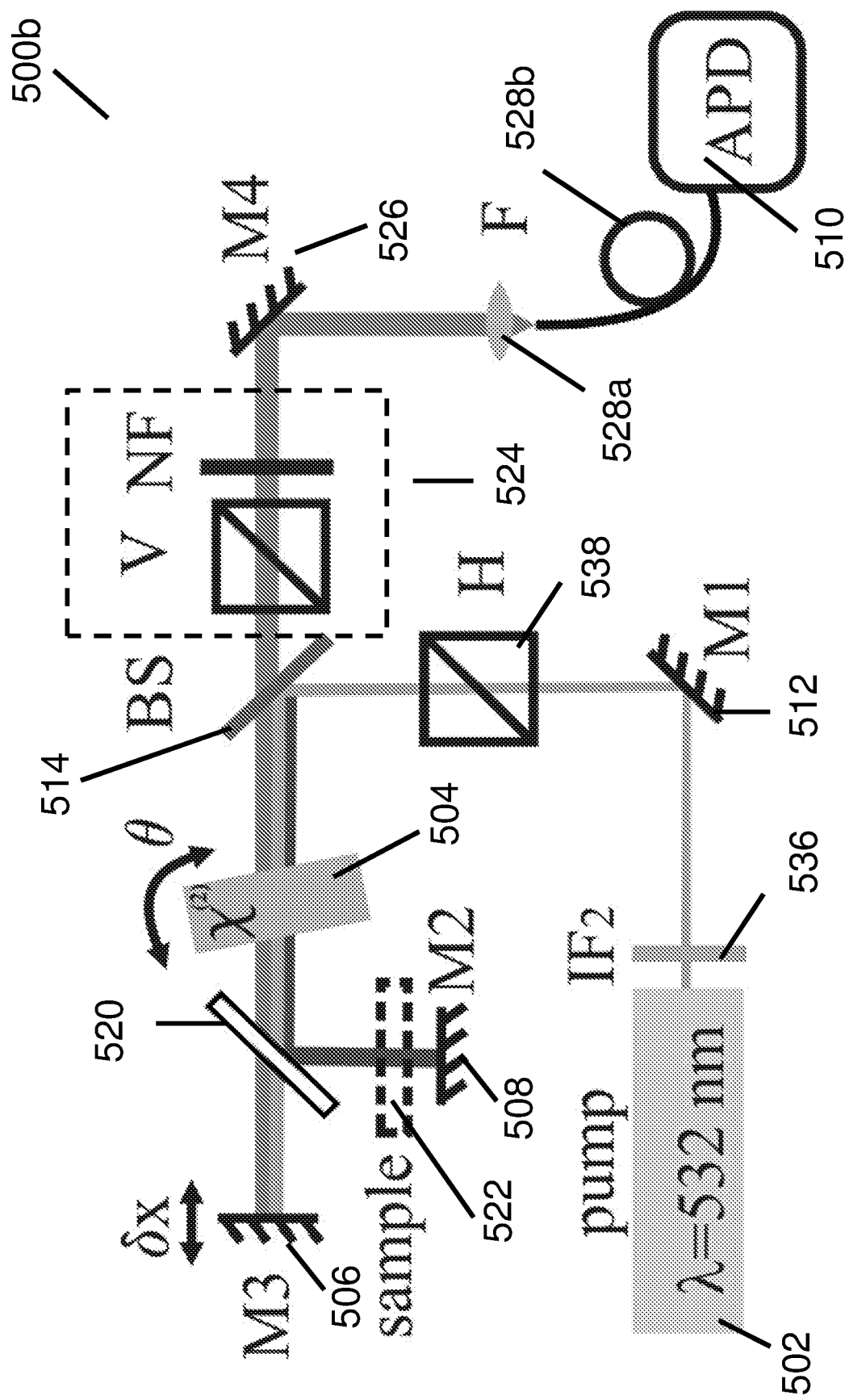
FIG. 5B shows a schematic of the optical system for determining a refractive index of a sample according to various other embodiments.

FIG. 5B shows a schematic of the optical system 500b for determining a refractive index of a sample according to various other embodiments. The optical system 500b may be similar to optical system 500a shown in FIG. 5A with some difference. Identical or similar components used in optical systems 500a, 500b are denoted by the same reference numerals. As shown in FIG. 5B, instead of mirror 508 being adjusted, mirror 506 may be adjusted. The photodetector 510 may be an avalanche photodiode (APD). The filter system 524 may include a polarizer (V) and notch filter (NF). The optical system 500b may also include a lens 528 a and an optical fiber 528 b for focusing the reflected visible signal light beam onto the APD 510. The source 502 may be configured to emit a laser beam of 532 nm. The optical system 500b may further include an interference filter 536 (denoted as IF) arranged in front of the source 502. In addition, the optical system 500b may include a polarizer 538 (denoted as H).

The process flow may include identifying the targeted range of wavelengths and the spectral resolution of the optical system or instrument. This may depend on a particular application of the instrument e.g. liquid analysis, gas measurements etc.

The material of the non-linear crystal may be selected. Major considerations may include (1) the crystal should be transparent for the signal, idler and pump beams; and (2) energy and wavevector conservation (phasematching) conditions should be satisfied to provide efficient down-conversion. Suitable crystals may include but may not be limited to Lithium Niobate ($LiNBO_3$), beta-barium borate (BBO), and Silver Thiogallate ($AgGaS_2$ or AGS).

The spontaneous parametric down conversion (SPDC) spectral function of modulation of the spectral function may be calculated or determined from energy and momentum conservation conditions, which may allow the determination of the optimum pinhole size for filtering the zero order of the interference pattern. The pinhole size may not be less than the divergence of the laser beam or pump beam.

The down converted beams may be adjusted to the desired operation wavelengths by varying the orientation of the optical axis of the non-linear crystal and/or the crystal temperature. The crystal orientations may be guided by calculations of energy and momentum conservation conditions for the selected crystal.

The length of the crystal may be so that the SPDC linewidth has either the equivalent or narrower spectral width than the targeted resolution of the instrument. Typical requirements for resolution in the infrared (IR) spectroscopy of gases may be 0.5 $cm^{-1}$ for solids and 4 $cm^{-1}$ for liquids.

The arms of the interferometer may be adjusted to be equal with the precision up to the shortest coherence length of interfering waves. The coherence length may be inversely proportional to the frequency bandwidth of the photon.

The dichroic beam splitter DM1 in FIG. 5A may separate the visible pump light beam from the visible signal light beam, and the dichroic beam splitter DM2 may separate the infrared light beams from the visible beams, i.e. the visible pump light beam and the visible signal light beam.

The sample under study may be inserted in the path in which only the IR photons (and not the visible light photons) are present. The sample may for instance be a gas/liquid cuvette, a solid sample or a powder. In various embodiments, information regarding properties of the sample under visible light or properties of visible light may not be required.

The reflecting mirrors may be carefully aligned to reflect the impinging light exactly back to the crystal. The accuracy of the alignment may be controlled for example by observation of the interference pattern of the pump beam.

The dependence of the intensity of the visible signal photons as a function of the position of one of the reflecting mirrors may be determined by using a photodiode. The properties of the sample at another wavelength may be determined by adjusting the crystal to the desired angle and/or the crystal temperature, and repeating the scanning/adjusting of the mirror using the adjusting system or translation stage. A number of interference patterns (interferograms) may be obtained or measured at different wavelengths of signal photons and idler photons. From this data, the dependence of the absorption and/or the refractive index on the wavelength may be determined.

In various embodiments, the optical system may use well developed components for visible light such as source, detector and/or other optical elements to determine or measure spectroscopic features in the IR range.

There may be no requirement for the refractive indexes of the medium for the visible beams (i.e. signal photons and pump photons) to be known in advance. Further, the sample may not be required to be transparent in the visible range.

Various embodiments may not require the use of a CCD camera. Various embodiments may include a point-like photodetector, which may allow the system to be more attractive for practical applications. A high level of sensitivity may be achieved by adjusting the path of idler photos through the sample without using a CCD camera having a small pixel size and large focal lens.

Only one non-linear crystal may be required. Various embodiments may reduce the costs, simplify alignment, and/or make it easy to tune the wavelength of the emitted light by using the crystal orientation and/or crystal temperature.

Further, as only the IR beam impinges the sample, various embodiments may eliminate or reduce possibility of the sample being damaged by the pump laser.

Figure 6:
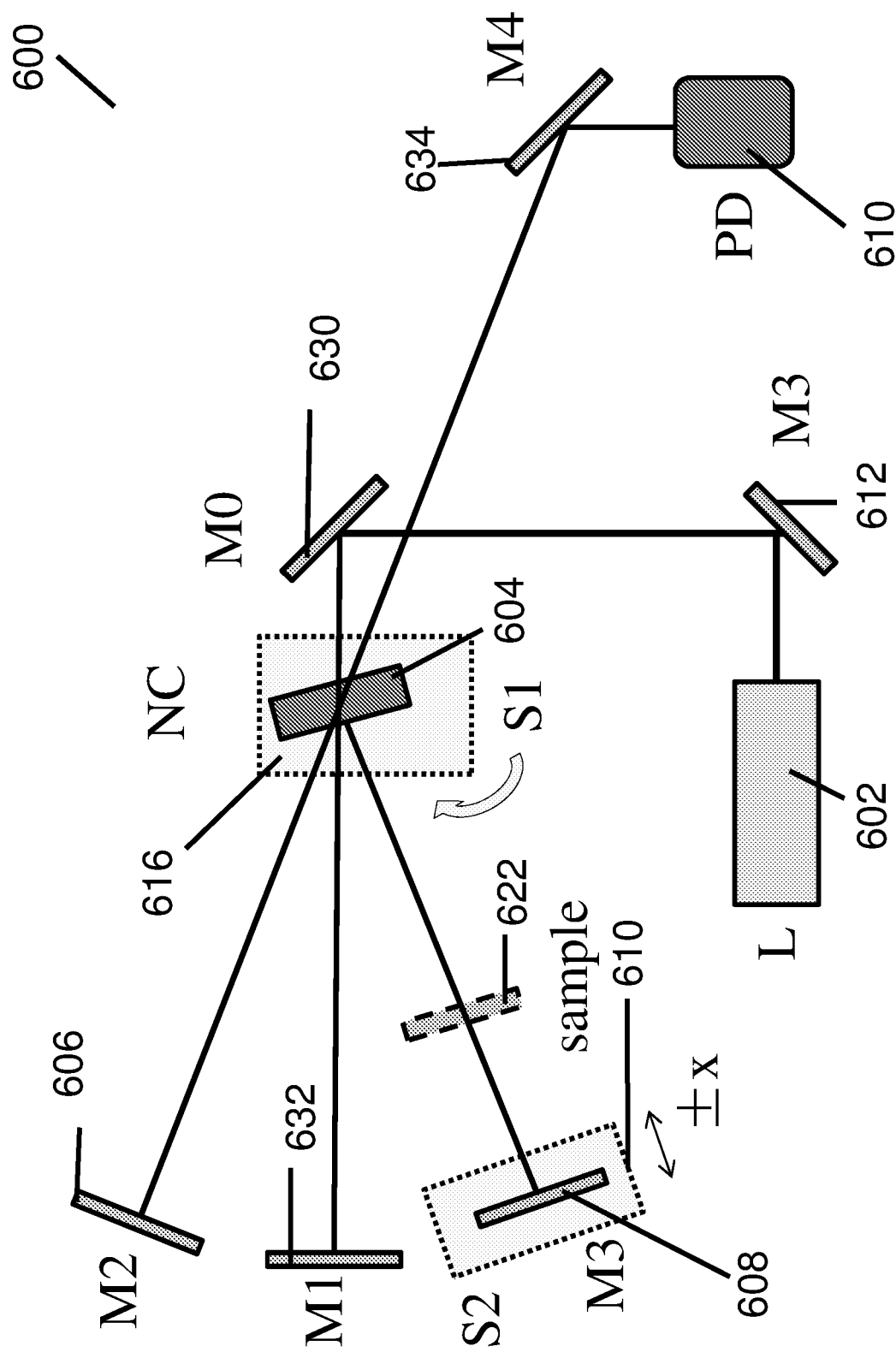
FIG. 6 shows a schematic of an optical system for determining a refractive index of a sample according to various embodiments.

FIG. 6 shows a schematic of an optical system 600 for determining a refractive index of a sample according to various embodiments. The optical system 600 may include a laser source 602 configured to emit a laser beam. The optical system 600 may also include a first directing mirror 612 (denoted as M3) and a second directing mirror 630 (denoted as M0) configured to direct the laser beam to the non-linear crystal 604 (denoted as NC, e.g. type-I SPDC) to pump the non-linear crystal 604. The crystal 604 may be mounted or attached to a rotation or temperature controlled stage 616 (denoted as S1). The rotation stage 616 may control the orientation of the optical axis of the non-linear crystal 604. The down-converted visible signal light beam, and the infrared light beam, as well as the visible pump light beam may be emitted from the crystal 604 in a non-collinear manner, i.e. in different directions. The visible signal light beam may travel from the non-linear crystal 604 in a first direction to the first mirror 606 (denoted as M2), the infrared light beam may travel may travel from the non-linear crystal 604 in a second direction to the second mirror 608 (denoted as M3), and the visible pump light beam may travel from the non-linear crystal 604 in a third direction to the third mirror 632 (denoted as M1). The first direction, the second direction, and the third direction may be different directions.

The mirrors 606, 608, 632 may be configured so that the incoming beams and the reflected beams are coherently overlapped. The distances between the respective mirrors 606, 608, 632 and the non-linear crystal 604 may be arranged or aligned so that the incoming beams and the reflected beams are coherently overlapped. Any one of the mirrors 606, 608, 632 may be mounted onto an adjusting system or scanning stage 610 so that the position or the displacement of the mirror may be controlled or adjusted.

The coherence lengths of the reflected visible beams, and the coherence length of the reflected infrared light beam may be equal to greater than the distance travelled by the beams between the crystal 604 and the mirrors 606, 608, or 634. The coherence length may be inversely proportional to the frequency bandwidth of the photon. By adjusting the scanning stage 610, the offset between the reflected beams may be adjusted so as to vary the intensity of the reflected visible signal light beam. The interference pattern of the reflected visible signal beam may form due to the coherent interaction of the reflected visible pump light beam, the reflected visible signal light beam, and the reflected infrared light beam in the non-linear crystal 604.

The optical system 600 may further include another directing mirror 634 (denoted as M4) to direct the reflected visible signal light beam from the non-linear crystal 604 to a photodetector 610.

The intensity modulation may be varied or recorded depending on the position of the adjusting system or scanning stage 610 in the interferometer (S2). The absorption and refraction coefficients at IR wavelength may be inferred from the interference pattern for the visible signal photons. This scheme as illustrated in FIG. 6 may provide a higher signal to noise ratio (SNR), because the visible pump light beam does not travel along with the visible signal light beam.

This scheme may also provide measurement of properties in the visible range if the sample is placed in the path of the visible signal beam. The refractive index of the sample in visible range may be determined based on determination of an intensity of the reflected signal light beam. However, this scheme may involve a more difficult alignment process compared to the scheme depicted in FIGS. 5A-B as it involves alignment of three interferometer arms instead of two.

Figure 7A:
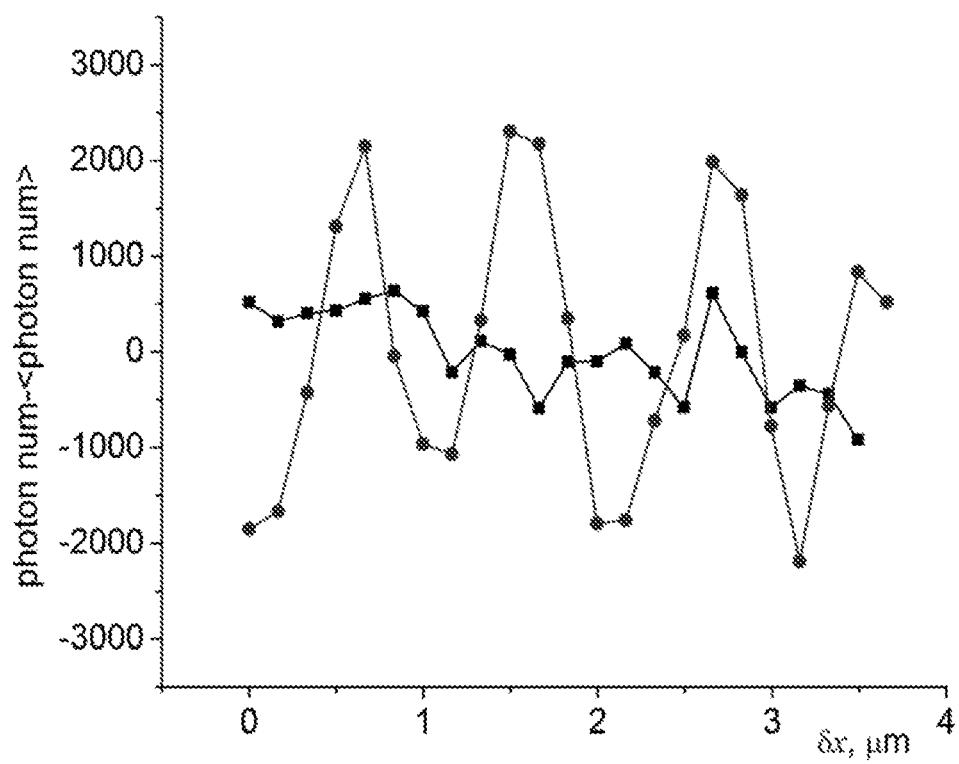
FIG. 7A is a plot of the photon number (photo num) as a function of displacement of the adjusting system showing the interference pattern of the visible signal light beam with wavelength of 663 nm when the infrared light beam passes through a vacuum (denoted by circles), and when the infrared light beam is blocked (denoted by squares) according to various embodiments.

FIG. 7A is a plot 700a of the photon number (photo num) as a function of displacement of the adjusting system showing the interference pattern of the visible signal light beam with wavelength of 663 nm when the infrared light beam passes through a vacuum (denoted by circles), and when the infrared light beam is blocked (denoted by squares) according to various embodiments. When the infrared light beam is blocked, the interference modulation disappears.

Figure 7B:
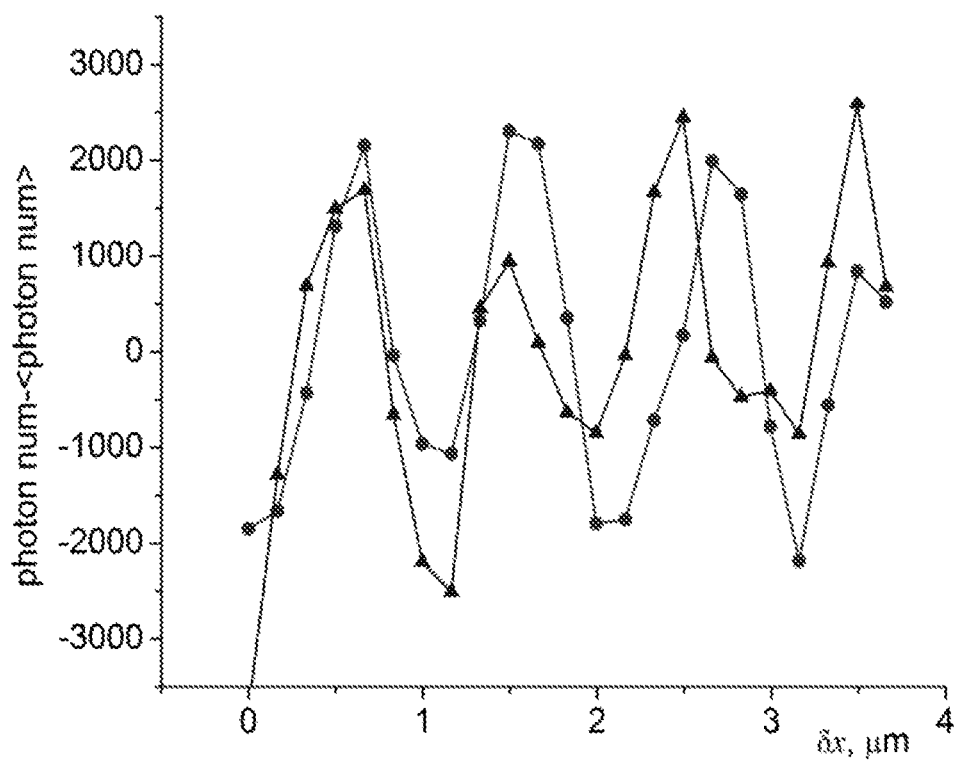
FIG. 7B is a plot of the photon number (photo num) as a function of displacement of the adjusting system showing the interference pattern of the visible signal light beam with wavelength of 663 nm when the infrared light beam passes through a vacuum (denoted by circles), and when the infrared light beam pass through a 100 μm thick polydimethylsiloxane (PDMS) sample (denoted by up triangles) according to various embodiments.

FIG. 7B is a plot 700b of the photon number (photo num) as a function of displacement of the adjusting system showing the interference pattern of the visible signal light beam with wavelength of 663 nm when the infrared light beam passes through a vacuum (denoted by circles), and when the infrared light beam pass through a 100 μm thick polydimethylsiloxane (PDMS) sample (denoted by up triangles) according to various embodiments. The absorption of the PDMS sample may shift the fringe and decrease the visibility of the fringes, thus allowing determination of the refractive index and/or absorption coefficient.

Figure 7C:
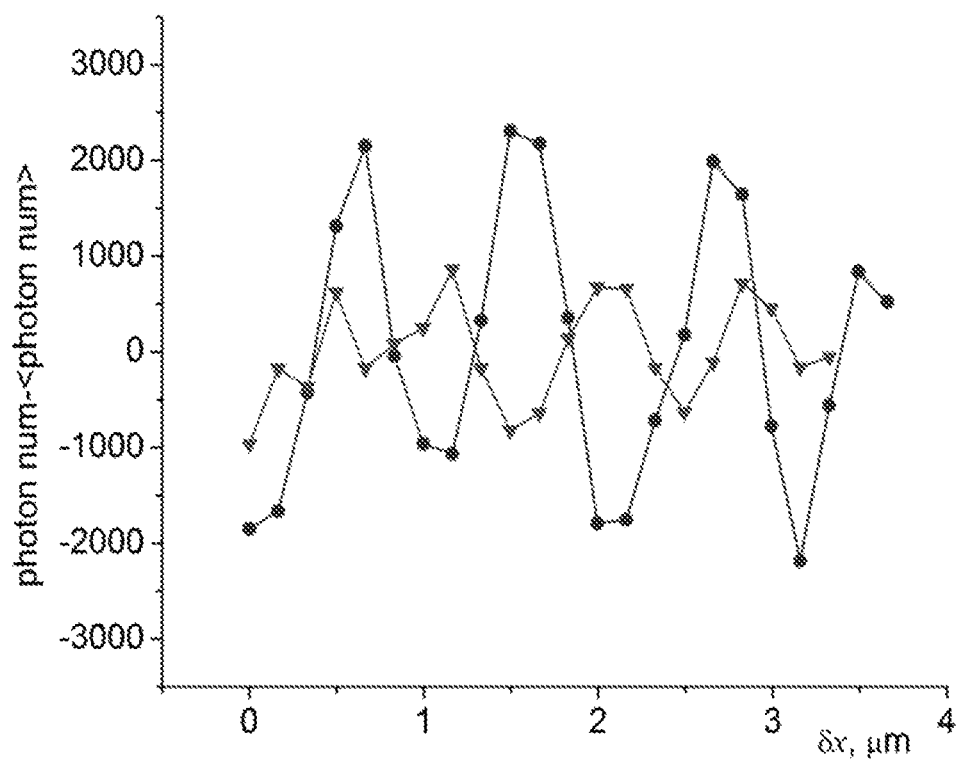
FIG. 7C is a plot of the photon number (photo num) as a function of displacement of the adjusting system showing the interference pattern of the visible signal light beam with wavelength of 663 nm when the infrared light beam passes through a vacuum (denoted by circles), and when the infrared light beam pass through a 200 μm thick polydimethylsiloxane (PDMS) sample (denoted by down triangles) according to various embodiments.

FIG. 7C is a plot 700c of the photon number (photo num) as a function of displacement of the adjusting system showing the interference pattern of the visible signal light beam with wavelength of 663 nm when the infrared light beam passes through a vacuum (denoted by circles), and when the infrared light beam pass through a 200 μm thick polydimethylsiloxane (PDMS) sample (denoted by down triangles) according to various embodiments. The interference pattern is decreased compared to the 100 μm PDMS sample shown in FIG. 7B due to the stronger absorption exhibited by the 200 μm PDMS sample.

The wavelength of the infrared light beam used in the setup to obtain FIGS. 7A-C is 2.7 μm.

Figure 7D:
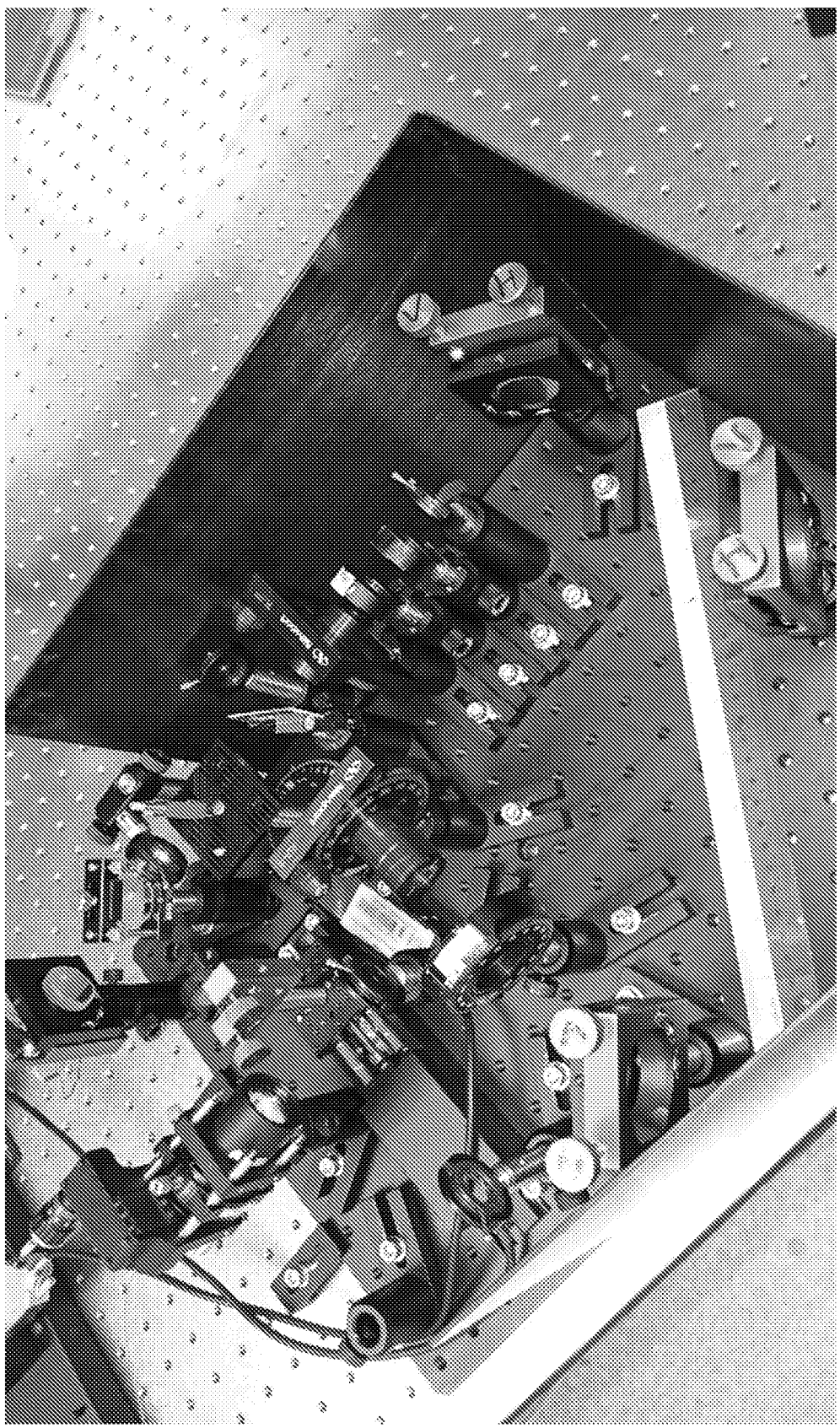
FIG. 7D shows an image of a prototype of the optical system according to various embodiments.

FIG. 7D shows an image 700d of a prototype of the optical system according to various embodiments.

Various embodiments may seek to achieve measurements of properties of the sample in the IR range using visible light optics without the requirement for knowledge of properties of the sample in the visible range. FIG. 8A shows a table 800a comparing the optical system according to various embodiments and several competing designs. The competing designs are shown in FIG. 1E (Kalashnikov et al.) and FIG. 1F (Lemos et al.). Moreover, in various embodiments, operation in the collinear regime may allow the interaction length with the sample to increase and thus increases the sensitivity. The setup may use only one nonlinear crystal, which makes it less resource intensive and easier to align. Various embodiments may also use a point-like photodetector instead of a CCD camera, which is more practical.

Various embodiments may provide a "minimalistic" optical setup which involves careful optical analysis of propagation of all three beams (i.e. visible signal light beam, infrared light beam, and visible pump light beam) at different wavelengths. Various embodiments have a reduced complexity compared to conventional solutions.

Various embodiments may provide an optical system in which reflected visible signal light beam, reflected infrared light beam, and reflected visible pump light beam in the non-linear crystal, despite have different wavelengths. The conditions to achieve this may include spatial and temporal overlap (within the shortest coherence length), phase scanning by a mirror (period defined by IR wavelength), proper selection of a collinear angular mode, and/or noise suppression.

FIG. 8B shows a table 800b comparing the optical system according to various embodiments and several competing designs. Prior Art 1 is the design shown in FIG. 1E, Prior Art 2 is the design shown in FIG. 1C and Prior Art 3 is the design shown in FIG. 1F.

FIG. 9A is a table 900a comparing several conventional techniques and the method according to various embodiments. Conventional techniques, such as FTIR and direct spectroscopy typically require components which operate in the IR range, such as a light source, optical elements and detectors. All these devices have their limitations in terms of operation bandwidth, efficiency, stability and/or signal-to-noise ratio. These limitations may drastically reduce applicability and flexibility of existing methods in the IR spectroscopy. As such, there is a strong push in the industry and research community towards development of functional IR-range optical instrumentation.

Various embodiments may be applicable to different media of different types (solid, gases and liquids) and may provide broadband tunability in wavelength by tilting the crystal because the emission wavelength is controlled by a crystal angle or a temperature.

FIG. 9B is a table 900b comparing direct spectroscopy, Fourier Transform Infrared (FTIR) spectroscopy and nonlinear interferometry. Several disadvantages of nonlinear interferometry have been eliminated or addressed in the optical system according to various embodiments.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical system for determining a refractive index of a sample, the optical system comprising:
   a laser source configured to emit a laser beam;
   a non-linear crystal configured to generate, based on the laser beam, an infrared light beam which passes through the sample, and a visible signal light beam;
   a first mirror configured to reflect the visible signal light beam;
   a second mirror configured to reflect the infrared light beam so that the reflected infrared light beam interacts with the reflected visible signal light beam in the non-linear crystal; and
   a photodetector configured to determine a property of the reflected visible signal light beam which has interacted with the reflected infrared light beam for determining the refractive index of the sample; and
   an adjusting system configured to adjust a position of the second mirror;
   wherein the first mirror is configured so that the reflected visible signal light beam is coherently overlapped with the visible signal light beam,
   wherein the second mirror is configured so that the reflected infrared light beam is coherently overlapped with the infrared light beam; and
   wherein the adjustment of the position of the second mirror varies an offset between the reflected visible signal light and the reflected infrared light, thereby varying an intensity of the reflected visible signal light beam so as to determine a real part and an imaginary part of the refractive index.

2. The optical system according to claim 1,
   wherein the non-linear crystal is further configured to generate, based on the laser beam, a visible pump light beam;
   wherein the first mirror is configured to reflect the visible pump light beam; and
   wherein the reflected visible pump light beam interacts with the reflected infrared light beam and the reflected visible signal light beam in the non-linear crystal.

3. The optical system according to claim 2, further comprising:
   a dichroic beam splitter configured to direct the laser beam to the non-linear crystal;
   wherein the dichroic splitter is further configured to separate the reflected visible signal light beam and the reflected visible pump light beam.

4. The optical system according to claim 3, further comprising:
   a further dichroic beam splitter configured to separate the infrared light beam from the visible light beam and the visible pump light beam so that the visible light beam and the visible pump light beam are reflected by the first mirror and the infrared light beam is reflected by the second mirror.

5. The optical system according to claim 4, further comprising:
a pinhole configured to allow a portion of the visible light beam, the visible pump light beam and the infrared light beam generated by the non-linear crystal through to the further dichroic beam splitter in a collinear direction.

6. The optical system according to claim 3, further comprising:
a filter system configured to filter out the reflected visible signal light beam for passing to the photodetector.

7. The optical system according to claim 1,
wherein the non-linear crystal is further configured to generate, based on the laser beam, a visible pump light beam;
wherein the optical system further comprises a third mirror configured to reflect the visible pump light beam; and
wherein the reflected visible pump light beam interacts with the reflected infrared light beam and the reflected visible signal light beam in the non-linear crystal.

8. The optical system according to claim 7,
wherein the visible signal light beam travels from the non-linear crystal in a first direction to the first mirror;
wherein the infrared light beam travels from the non-linear crystal in a second direction to the second mirror;
wherein the visible pump light beam travels from the non-linear crystal in a third direction to the third mirror; and
wherein the first direction, the second direction, and the third direction are different directions.

9. The optical system according to claim 1,
wherein the non-linear crystal comprises any one material selected from a group consisting of lithium niobate, beta-barium borate, and silver thiogallate.

10. The optical system according to claim 1,
wherein the non-linear crystal is configured to generate the infrared light beam and the visible signal light beam based on a parametric down conversion process.

11. The optical system according to claim 1,
wherein the property of the reflected visible signal light beam is an intensity of the reflected visible signal light beam.

12. The optical system according to claim 1,
wherein the photodetector is a point photodetector.

13. A method of forming an optical system for determining a refractive index of a sample, the method comprising:
providing a laser source configured to emit a laser beam;
providing a non-linear crystal configured to generate, based on the laser beam, an infrared light beam which passes through the sample, and a visible signal light beam;
providing a first mirror configured to reflect the visible signal light beam;
providing a second mirror configured to reflect the infrared light beam so that the reflected infrared light beam interacts with the reflected visible signal light beam in the non-linear crystal; and
providing a photodetector configured to determine a property of the reflected visible signal light beam which has interacted with the reflected infrared light beam for determining the refractive index of the sample; and
providing an adjusting system configured to adjust a position of the second mirror;
wherein the first mirror is configured so that the reflected visible signal light beam is coherently overlapped with the visible signal light beam,
wherein the second mirror is configured so that the reflected infrared light beam is coherently overlapped with the infrared light beam; and
wherein the adjustment of the position of the second mirror varies an offset between the reflected visible signal light and the reflected infrared light, thereby varying an intensity of the reflected visible signal light beam so as to determine a real part and an imaginary part of the refractive index.

14. A method of operating an optical system for determining a refractive index of a sample, the method comprising:
emitting, using a laser source, a laser beam;
generating, based on the laser beam and using a non-linear crystal, an infrared light beam which passes through the sample, and a visible signal light beam;
reflecting, using a first mirror, the visible signal light beam;
reflecting, using a second mirror, the infrared light beam so that the reflected infrared light beam interacts with the reflected visible signal light beam in the non-linear crystal; and
determining, using a photodetector, a property of the reflected visible signal light beam which has interacted with the reflected infrared light beam to determine the refractive index of the sample;
adjusting, using an adjustment system, a position of the second mirror to vary an offset between the reflected visible signal light and the reflected infrared light, thereby varying an intensity of the reflected visible signal light beam so as to determine a real part and an imaginary part of the refractive index;
wherein the first mirror is configured so that the reflected visible signal light beam is coherently overlapped with the visible signal light beam, and
wherein the second mirror is configured so that the reflected infrared light beam is coherently overlapped with the infrared light beam.

15. The method according to claim 14,
wherein the infrared light beam and the visible signal light beam are generated from the laser beam using a parametric down conversion process.

16. The method according to claim 14, further comprising:
generating, based on the laser beam and using the non-linear crystal, a visible pump light beam;
wherein the reflected visible signal light beam determined by the photodetector has also interacted with the visible pump light beam.

17. The method according to claim 16,
wherein the visible pump light beam is reflected by the first mirror.

18. The method according to claim 16,
wherein the visible pump light beam is reflected by a third mirror.

* * * * *